INVENTOR:

Manfred Matzl
by Erwin Salzer, atty

Sept. 9, 1969 M. MATZL 3,466,530
LOGIC-UNIT-CONTROLLED THYRISTOR TAP-CHANGING TRANSFER
SWITCH HAVING TRIGGER IMPULSE AMPLIFIER
Filed April 4, 1967 4 Sheets-Sheet 2
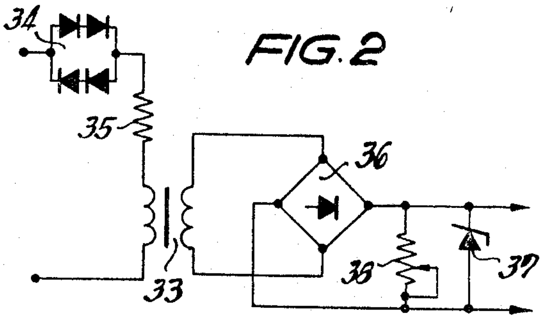
FIG. 2
FIG. 2a
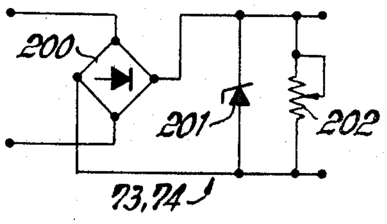
FIG. 3
NAND-GATE
| E1''' | E2''' | A''' |
|---|---|---|
| 0 | 1 | 1 |
| 0 | 0 | 1 |
| 1 | 0 | 1 |
| 1 | 1 | 0 |
NOR-GATE
| E1' | E2' | A' |
|---|---|---|
| 0 | 1 | 0 |
| 0 | 0 | 1 |
| 1 | 0 | 0 |
| 1 | 1 | 0 |
INVENTOR:
Manfred Matzl
by Erwin Salzer, Atty

INVENTOR:

Manfred Matzl
by Erwin Salzer, Atty.

INVENTOR:

United States Patent Office 3,466,530
Patented Sept. 9, 1969

3,466,530

LOGIC-UNIT-CONTROLLED THYRISTOR TAP-CHANGING TRANSFER SWITCH HAVING TRIGGER IMPULSE AMPLIFIER

Manfred Matzl, Regensburg-Zeitlarn, Germany, assignor to Maschinenfabrik Reinhausen Gebruder Scheubeck K.G., Regensburg, Germany Filed Apr. 4, 1967, Ser. No. 628,490
Claims priority, application Germany, Apr. 16, 1966, M 69,179
Int. Cl. H02p 13/06; H02m 5/12
U.S. Cl. 323—43.5 6 Claims

ABSTRACT OF THE DISCLOSURE

A transfer switch including thyristors for effecting tap-changing operations in tapped regulating transformers. The tap-changing thyristors are under the control of a trigger impulse amplifier, or trigger impulse amplifying transformer. The latter is, in turn, under the control of digital logic units. Blocking voltage sensing means are connected across the tap-changing thyristors and the output of the blocking voltage sensing means is fed into the aforementioned digital logic units. These digital logic units are also controlled by a bistable circuit and control, in turn, the aforementioned trigger impulse amplifier. The latter triggers tap-changing thyristors only when the bistable circuit is in one predetermined of its stable states, and when the blocking voltage sensing means signal the presence of a predetermined blocking voltage to said digital logic units.

Background of invention

Tapped regulating transformers include tap selector means, or tap selector switches, and transfer switch means, or transfer switches. The former are used to select any desired tap among a plurality of taps associated with a tapped transformer winding, and the latter are used to establish a conductive connection between the selected tap and an outgoing line carrying the load current. The former establish current paths, but do not interrupt, or break, load currents. This task is performed by the transfer switches.

A number of design proposals have been made to substitute static solid state switching devices for the more conventional transfer switches having relatively movable contacts. The latter have been used, and are still widely used, for performing tap-changing operations.

It is an object of this invention to provide thyristor-controlled transfer switches which are not subject to limitations and drawbacks of prior art devices of this description.

The closest prior art known is Belgian Patent 612,572 to Siemens-Schuckertwerke. This patent discloses a transfer switch comprising a first tap-changing circuit having a pair of parallel branches including inversely connected thyristors and having two terminals, and a second tap-changing circuit having a pair of parallel branches including inversely connected thyristors and having two terminals. The transfer switch further includes means for conductively connecting one terminal of said first tap-changing circuit to a first tap of a transformer winding and for conductively connecting another terminal of said first tap-changing circuit to an outgoing line carrying the load current. The transfer switch further includes means for conductively connecting one terminal of said second tap-changing circuit to a second tap of a transformer winding and for conductively connecting another terminal of said second tap-changing circuit to said outgoing line.

A first voltage-sensing device is connected across said first tap-changing circuit, and a second voltage sensing device is connected across said second tap-changing circuit. A tap-changing operation involves closing the circuit of one of the voltage sensing devices, and applying the voltage prevailing between contiguous taps across said one of the voltage sensing devices. The voltage sensing device has an output circuit which is connected to the thyristors of one of the two tap-changing circuits, namely the one which is not shunted by the particular voltage sensing device. The gate circuits of the thyristors of the one of the two tap-changing circuits which is current-carrying at the time are interrupted, and this allows the current to flow through these thyristors only to the point of time of the next natural zero of the current wave, and then these thyristors become non-conductive after a few microseconds. A small fraction of the load current previously flowing through the tap-changing circuit which has become non-conductive flows after current zero through the voltage sensing device shunting the same, and the output of that voltage sensing device triggers the thyristors of the other heretofore not conductive tap-changing circuit, i.e. of the tap-changing circuit directly connected to the tap to which one intends to switch.

Summarizing, upon interruption of the load current flowing in the first tap-changing circuit a small current flows through the first voltage-sensing device. The residual current flowing through the first voltage-sensing device may be used to control the triggering of the thyristors forming part of the second tap-changing circuit.

What has been stated above in regard to the first tap-changing circuit, the first voltage-sensing device and the second tap-changing circuit applies in an analogous fashion to the second tap-changing circuit, the second voltage-sensing device and the first tap-changing circuit.

After interruption of the current flow in one of the tap-changing circuits and triggering of the thyristors in the second tap-changing circuit a tap-changing operation is substantially completed, and a new stationary circuit condition reached.

Thyristors require predetermined amounts of energy for triggering the same, and this results in the above referred-to prior art solid state transfer switch in a delay of the trigger pulses, i.e. the thyristors to be triggered are triggered some time after a natural current zero.

It is one object of this invention to reduce the time-lag involved in triggering the thyristors of the aforementioned prior art solid state transfer switch.

The subject-matter of the instant application is closely related to my copending patent application Ser. No. 619,228 filed Feb. 28, 1967, for Tapped Regulating Transformer Having Thyristor Transfer Switch Means.

Summary

The aforementioned object is achieved by blocking trigger pulses to trigger the thyristors of one tap-changing circuit by the voltage prevailing across the non-conducting thyristors of the other tap-changing circuit and by means of digital logic elements which determine the triggering of the thyristors of said one tap-changing circuit.

Preferably the thyristors of said one tap-changing circuit are triggered by the intermediary of an impulse amplifier, or impulse transformer, which has a primary circuit which is energized by a D-C power supply.

The impulse amplifier may include two primary windings each shunted by a diode and under the control of one of a pair of transistor cascades. One of the transistors of each transistor cascade is serially connected with one of the primary windings of the impulse amplifier, or impulse transformer. The impulse transformer includes two pairs of secondary windings, each pair magnetically coupled with one of the two primary windings thereof. Each secondary winding of the impulse transformer is connected across the control electrode and the cathode of one of the thyristors in the first tap-changing circuit and the second tap-changing circuit, respectively. The positive terminal of the D-C power supply for energizing the impulse transformer is connected to one of the terminals of the primary windings thereof, and the negative terminal of the aforementioned power supply is connected to the emitters of the transistors.

The impulse transformer may be controlled by a combination of the aforementioned voltage-sensing means with NOR gates and inverter gates. In such an arrangement the respective primary winding of the impulse transformer must be energized by the D-C power supply during the entire time the thyristors of one tap-changing circuit are conducting, except for the short time intervals when the blocking voltage across the thyristors of the other tap-changing circuit becomes zero.

In order to be able to reduce the size of the impulse transformer it is desirable to control the same by short pulses which are controlled by the aforementioned voltage-sensing devices in combination with current-sensing devices and NOR gates and NAND gates.

Brief description of drawings

FIG. 2 is a circuit diagram of an auxiliary circuit for the transfer switch circuitry of FIG. 1 and FIG. 4, i.e. of a blocking voltage sensing device;

FIG. 2*a* is a circuit diagram of an auxiliary circuit for the transfer switch circuitry of FIG. 4, i.e. of a current-sensing device;

FIG. 3 is a truth table of the NAND gates and of the NOR gates of the circuitry of FIG. 4;

Description of preferred embodiments of the invention

Figure 1:
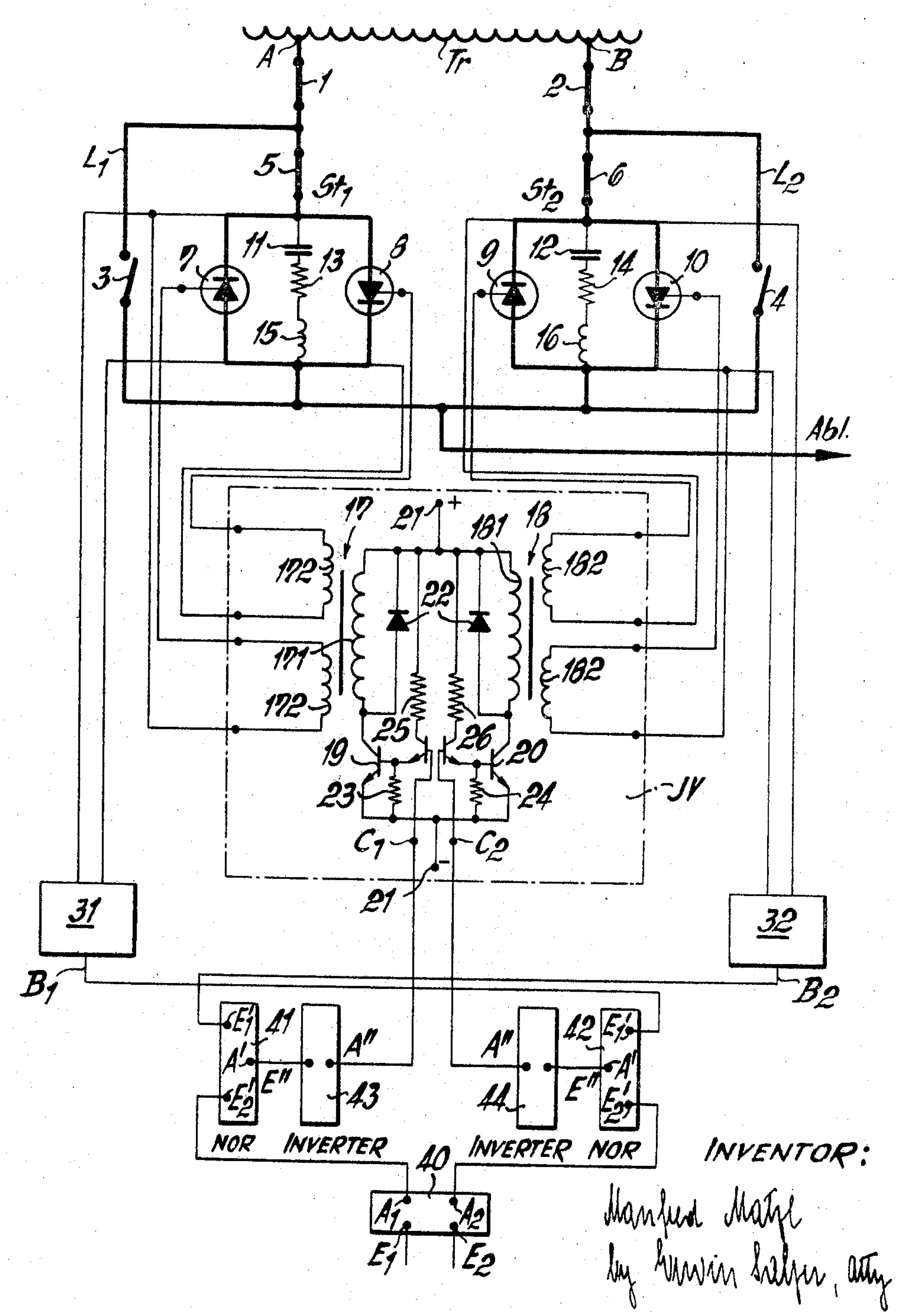
FIG. 1 is a circuit diagram of a transfer switch circuitry including an impulse amplifier under the control of a logic circuitry.

In FIG. 1, reference character T*r* has been applied to indicate a tapped transformer winding having two taps A and B. The other windings of the transformer have not been shown in FIG. 1. Actually winding T*r* will have a much larger number of taps than two, but for describing the instant invention it is sufficient to consider but two taps, i.e. the aforementioned taps A and B. In FIG. 1 reference characters 1 and 2 have been applied to indicate two pairs of selector switch contacts of which one is conductively connected to tap A and the other to tap B. Contacts 1 and 2 are connected by leads L1 and L2 to outgoing line *Abl.* Leads L1 and L2 include pairs of separable current-carrying contacts 3 and 4, respectively. Current-carrying contacts are contacts capable of carrying relatively large currents for protracted periods of time, as distinguished from arcing contacts which are not capable of performing this particular duty, but capable of interrupting current-carrying circuits and to withstand the resulting arcing conditions. In the stationary state of the transformer of FIG. 1, i.e. in the periods of time when no tap-changing operation is performed, one pair 3 or 4 of the two pairs of current-carrying contacts 3, 4 carries the entire load current to the outgoing line A*bl.*

Reference characters $St_1$ and $St_2$ have been applied to generally indicate two identical networks, or tap-changing circuits. Disconnect 5 is arranged to selectively connect contacts 1 with network or tap-changing circuit $St_1$, and to disconnect contacts 1 from network or tap-changing circuit $St_1$. Disconnect 6 is arranged to selectively connect contacts 2 with network or tap-changing circuit $St_2$, and to disconnect contacts 2 from network or tap-changing circuit $St_2$. Network or tap-changing circuit $St_1$ includes a pair of thyristors 7 and 8 inversely connected in parallel, i.e. whose polarity is reversed, and it further includes serially connected capacitor 11, damping resistor 13 and air-core choke 15. Parts 11, 13 and 15 are connected in parallel to thyristors 7, 8. Capacitor 11 is capable of carrying the load current without significant voltage drop during short intervals of time required for triggering the thyristors and to limit the voltage drops occurring across the thyristors. The air-core choke 15 is provided for limiting the rate of rise of the capacitor discharge currents to magnitudes compatible with the characteristics of thyristors 7 and 8. The inductance of air-core choke 15 is in the order of a few $\mu$henrys.

As mentioned above, networks or tap-changing circuits $St_2$ and $St_1$ are identical. The former includes inversely parallel connected thyristors 9 and 10, capacitor 12, damping resistor 14 and air-core choke 16.

Reference character JV has been applied to generally indicate an impulse amplifier. The latter includes impulse transformers 17, 18 having primary windings 171 and 181. The circuits of the latter include cascades 19 and 20 of transistors, and are energized by a D-C power supply whose terminals have been indicated by the reference characters 21+ and 21−. The aforementioned primary windings 171 and 181 of impulse transformers 17, 18 are shunted by diodes 22. Each impulse transformer 17, 18 includes a pair of secondary windings 172 and 182, respectively. The secondary windings 172 of impulse transformer 17 are connected across electrodes (gate and cathode) of thyristors 7 and 8. In a like fashion the secondary windings 182 of impulse transformer 18 are connected across electrodes (gate and cathode) of thyristors 9 and 10. Reference characters 23 and 24 have been applied to indicate resistors across the bases and the emitters of a pair of the cascaded transistors, and reference characters 25 and 26 have been applied to indicate a pair of resistors provided for limiting the control current of transistor cascades 19 and 20.

Reference numeral 31 has been applied to indicate a blocking voltage sensing device connected in parallel to thyristors 7 and 8, and reference numeral 32 has been applied to indicate a blocking voltage sensing device connected in parallel to thyristors 9 and 10. The circuitry of blocking voltage sensing devices 31 and 32 has been shown in FIG. 2.

Referring now to FIG. 2, the blocking voltage sensing device shown therein includes a transformer 33 having a primary circuit which includes a resistor 35 connected in series with the primary winding of transformer 33. Reference numeral 34 has been applied to indicate a group of four diodes arranged in pairs in two parallel branches of the primary circuit of transformer 33. The polarity of the diodes in each of these two branches is reversed. The aforementioned diodes establish a predetermined threshold current, and the resistor 35 limits the current in the circuit of the secondary winding of transformer 33. The circuit of the secondary winding of transformer 33 includes a four terminal single-phase rectifier bridge generally indicated by reference numeral 36. The D-C output circuit of rectifier bridge 36 includes the Zener or breakdown diode 37 and the resistor 38 connected in parallel with Zener or breakdown diode 37. Resistor 38 permits to adjust the time of response of the digital logic elements of the transfer switch, as will be shown below more in detail.

Referring now again to FIG. 1 numeral 40 has been applied to indicate a bistable circuit having two stable states. Bistable circuit 40 has two input terminals $E_1$ and $E_2$ intended to reecive tap-changing control signals and two output terminals $A_1$ and $A_2$. The latter are connected to NOR gates 41 and 42 having input terminals $E_1'$ and $E_2'$. The input terminals $E_1'$ and $E_2'$ of NOR gates 41, 42 are connected to the output terminals $B_1$ and $B_2$ of blocking voltage sensing devices 31 and 32, respectively. The output terminals A′ of NOR gates 41 and 42, respectively, are connected to inverters 43 and 44 which invert the output signals of gates 41 and 42. Reference characters E″ and A″ have been applied to indicate the input terminals and the output terminals, respectively, of inverter gates 43 and 44. The output terminals A″ of inverter gates 43, 44 are connected to the input terminals $C_1$ and $C_2$ of transistor cascades 19 and 20, respectively, i.e. the input terminals of impulse amplifier JV. Bistable circuit 40 may be of conventional design, e.g. as shown at K in FIG. 3*a* of my above referred-to copending patent application.

The two blocking voltage sensing devices 31 and 32, respectively, have no effect upon the removal of the triggering pulses from the conducting thyristors 7, 8 or 9, 10, once a tap-changing operation signal has been given. Devices 31 and 32, respectively, transmit a D-C signal to the NOR gates 42 and 41, respectively, when one of the above referred-to pairs of thyristors 7, 8 or 9, 10, has become non-conductive. This is due to the presence of the diodes 34 (see FIG. 2) in devices 31 and 32, respectively, which establish a predetermined threshold value of response. When a voltage is applied to input terminals $E_1'$ and $E_2'$ of NOR gate 41 or 42, a voltage appears at the output terminals A″ of inverters 43 or 44, respectively, and at the input terminals $C_1$, $C_2$ of impulse amplifier JV or the transistor cascades 19, 20 thereof. As a result, either of impulse transformers 17, 18 transmits a trigger impulse to thyristors 7, 8, or thyristors 9, 10, respectively. The impulse transformers 17, 18 must transmit energy during the entire time required to trigger thyristors 7, 8 and 9, 10, respectively, except during the times when the blocking voltage sensed by devices 31, 32 is virtually zero. This makes it necessary to provide relatively large impulse transformers 17, 18.

Figure 4:
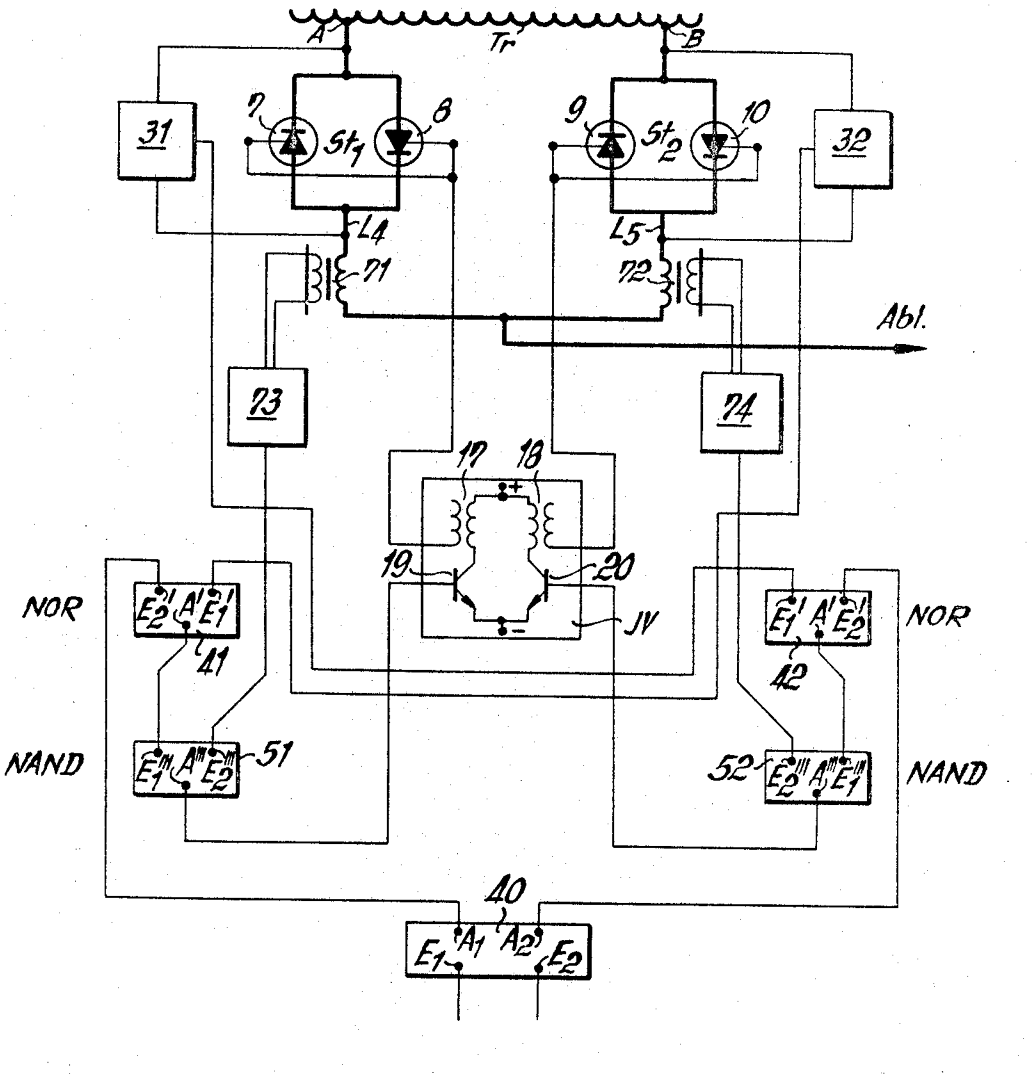
FIG. 4 is a circuit diagram of a modification of the circuitry of FIG. 1.

In the embodiment of the invention shown in FIG. 4 the thyristors 7, 8 and 9, 10 are triggered by short pulses, and this makes it possible to greatly reduce the dimensions of impulse transformers 17, 18.

FIG. 4 refers basically to the same circuitry as FIG. 1 and shows this circuitry in simplified form, omitting for the sake of simplicity and clarity a number of elements which have been shown in FIG. 1. FIG. 4 shows a tapped transformer winding T*r* including a pair of taps A, B. It further shows a pair of networks or tap-changing circuits $St_1$ and $St_2$ of which each is conductively connected to one of the pair of taps A, B. Each network or tap-changing circuit $St_1$, $St_2$ includes a pair of parallel branches, a thyristor 7, 8 and 9, 10 being included in each of these branches. The polarity of thyristors 7, 8 and of thyristors 9, 10 is reversed. In FIG. 4 reference numerals 31, 32 have been applied to indicate a pair of blocking voltage sensing devices identical to those shown in FIGS. 1 and 2 and described in connection with these two figures. FIG. 4 further shows an impulse amplifier JV including a pair of impulse transformers 17, 18 and a pair of transistor cascades 19, 20 which have been indicated in a diagrammatic fashion. Parts or components JV, 17, 18 and 19, 20 have been described in detail in connection with FIG. 1. The circuitry of FIG. 4 further includes a pair of NOR logic elements or NOR gates having input terminals $E_1'$ and $E_2'$ and output terminals A″. In addition to these NOR gates the circuitry of FIG. 4 includes a pair of NAND gates to which reference characters 51 and 52 have been applied. NAND gates 51 and 52 include the input terminals $E_1'''$ and $E_2'''$ and the output terminals A‴. Input terminals $E_1'''$ of NAND gates 51, 52 are connected to output terminals A′ of NOR gates 41, 42. The output terminals of NAND gates 51, 52 are connected to the transistor cascades 19, 20 in impulse amplifier JV. It will be noted that the circuitry of FIG. 4 does not include the inverters 43, 44 of the circuitry of FIG. 1. Conductors $L_4$, $L_5$ conductively connect the networks, or tap-changing circuits $St_1$ and $St_2$, with the outgoing line A*bl*. The currents flowing in conductors $L_4$, $L_5$ energize the primary windings of transformers 71 and 72, respectively. The secondary windings of transformers 71 and 72 are conductively connected to current-sensing devices 73, 74. These devices indicate the load currents in networks or tap-changing circuits $St_1$ and $St_2$ in terms of a D-C voltage. This D-C voltage is applied to the input terminals $E_2'''$ of NAND gates 51, 52. The D-C voltage in the output circuit of current-sensing devices 73, 74 becomes zero only at the time when the load current in conductors $L_4$ and $L_5$ and in outgoing line A*bl* becomes zero, i.e. when said load current passes through a natural zero of the current wave. The output of current-sensing devices 73, 74 affects the NAND gates 51, 52 in such a way that trigger impulses for thyristors 7, 8 and 9, 10 are transmitted by the intermediary of impulse amplifier JV only at times when the load current of the transformer of which tapped winding T*r* forms a part is close to a natural zero of the current wave.

FIG. 2*a* shows the circuitry of one of the current-sensing devices 73, 74 of FIG. 4. The two terminals of the secondary windings of transformers 71, 72 are connected to a four terminal single-phase rectifier bridge 200. The D-C circuit of rectifier bridge 200 includes the Zener or breakdown diode 201 and the adjustable resistor or potentiometer 202. The Zener or breakdown diode 201 limits the output signal of current-sensing devices 73, 74, and the resistor or potentiometer 202 makes it possible to control the ratio of the load current flowing in conductors $L_3$, $L_4$ and outgoing line A*bl* to the output voltage of current-sensing devices 73, 74.

The truth table to the left of FIG. 3 refers to the NAND gates 51, 52 of FIG. 4, and the truth table to the right of FIG. 4 refers to the NOR gates 41, 42 of FIG. 4. Signal 0=voltage and the signal 1=no voltage at the input terminals and the output terminals of the NAND gates and of the NOR gates.

A tap-changing operation from tap A to tap B of winding T*r* involves the following steps. The tap-changing operation proper is initiated by opening of current-carrying contacts 3 (shown in FIG. 1) and closing of both disconnects 5, 6 (shown in FIG. 1). Both pairs of selector contacts 1, 2 (shown in FIG. 1) are likewise closed. Triggering of thyristors 7 and 8 is effected preparatory to opening of current-carrying contacts 3, and closing of disconnects 5, 6. Upon opening of current-carrying contacts 3 and closing of disconnect 5 the entire load current flows through network or tap-changing circuit $St_1$, i.e. through thyristors 7 and 8. The voltage prevailing between taps A and B is then applied across thyristors 9 and 10. Consequently the blocking voltage-sensing device 32 transmits a positive signal (signal 0) to the input terminal $E_1'$ of the NOR gate 41. The second input $E_2'$ of NOR gate 41 is fed from the bistable circuitry 40 with signal 0, i.e. a voltage, when it is intended to trigger thyristors 7 and 8.

As is apparent from the truth table FIG. 3, the NOR gate 41 emits a signal 1 from the output terminal A′ thereof if both inputs of NOR gate 41 are signal 0. If there is a flow of current through one of thyristors 7, 8, of FIG. 4 current-sensing device 73 transmits signal 0 to the input terminal $E_2'''$ of NAND gate 51. Hence signal 1 is transmitted from the output terminal A‴ of NAND gate 51 to transistor cascade 19 of impulse amplifier JV, and the latter is blocked, i.e. no trigger pulses are being fed to thyristors 7 and 8. If the momentary value of the load current should be close to zero at the particular point of time, the signal 1 is applied to both terminals $E_1'''$ and $E_2'''$ of the NAND gate 51, and a voltage appears at the output terminal A‴ of NAND gate 51. Consequently the impulse amplifier JV supplies thyristors 7 and 8 with a triggering pulse until such times as the triggering circuitry is not rendered ineffective by the operation of the current sensor 73. It may be added that there is a pause in the order of a few milli-seconds when the trigger pulse becomes ineffective when the blocking voltage across network or tap-changing circuit $St_2$ becomes zero.

Referring now again to FIG. 1, if the thyristors 7 and 8 should be rendered non-conductive and the thyristors 9 and 10 be triggered, the transfer signal is transferred from the input terminal $E_2'$ of NOR gate 41 to the input terminal $E_2'$ of NOR gate 42. This takes but a few microseconds. The signal is further transmitted from NOR gate 42 only after thyristors 7 and 8 have become non-conductive. This precludes an overlap of the time when thyristors 7, 8 and 9, 10, respectively, are conductive. Thyristors 9 and 10 are triggered when the signal 1 appears at the output terminal A' of NOR gate 42. As described above in connection with the operation of current-sensing device 73 of FIG. 4, the load current energizing current-sensing device 74 effects an interruption of the pulses triggering thyristors 9 and 10. Disconnect 5 (see FIG. 1) is opened and thereupon current-carrying contacts 4 (see FIG. 1) are closed, thyristors 9 and 10 are rendered non-conductive and the disconnect 6 is opened (see FIG. 1). This terminates the transfer switching operation from tap A of winding T*r* to tap B thereof.

The transfer from tap B to tap A is effected substantially in the same way as the transfer from tap A to tap B, except that the sequence of steps is inverted.

The operation of the circuitry of FIG. 1 is very similar to that of FIG. 4. In the circuitry of FIG. 1 the blocking voltage-sensing devices 31 and 32, respectively, and the bistable circuitry 40 control jointly but one NOR gate 41 and 42, respectively, and the NOR gates 41, 42 control the impulse amplifier by the intermediary of inverter gates 43, 44. The impulse amplifier JV triggers thyristors 7, 8 and 9, 10, respectively.

The circuitry of FIG. 1 is not as complex as that of FIG. 4, but the latter has the advantage over the former of requiring a smaller impulse amplifier JV since it emits much shorter trigger pulses for thyristors 7, 8 and 9, 10 than the circuitry of FIG. 1.

Figure 5:
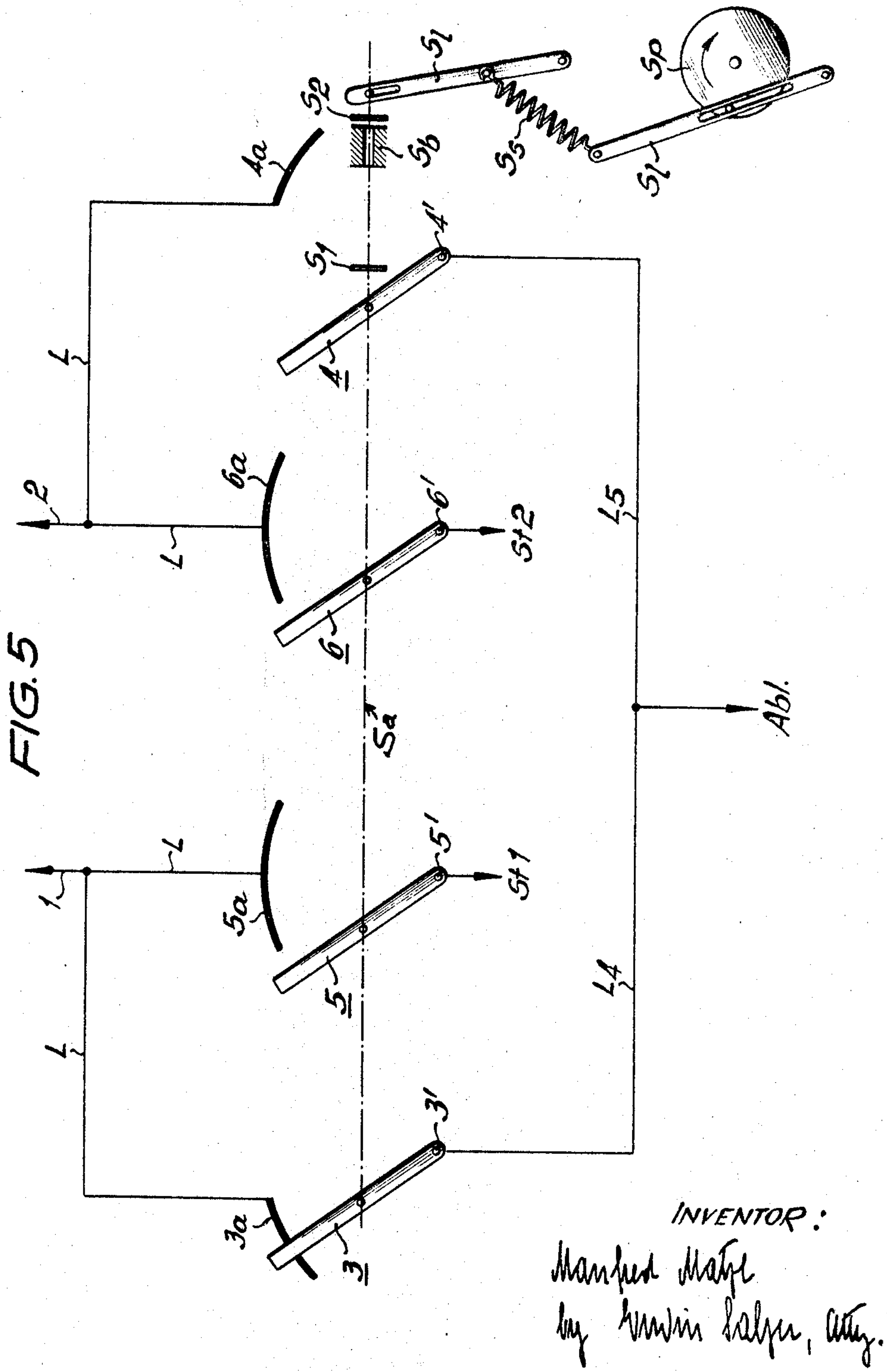
FIG. 5 is a diagrammatic representation of the contact operating mechanism for the relatively movable contacts forming part of the circuitry of FIGS. 1 and 4.

Referring now to FIG. 5 illustrating in a diagrammatic fashion the mechanism for operating the various separable contacts of the circuitry of FIGS. 1 and 4, FIG. 5 shows the two pairs of current-carrying contacts 3, 4 each being formed by a blade pivoted at 3' and 4', respectively, and cooperating with a stationary arcuate contact 3*a* and 4*a*, respectively, Leads L4 and L5 connect the current-carrying blade contacts with the outgoing line A*bl*. The disconnects 5 and 6 include blade contacts pivotable at 5' and 5', respectively, and cooperating with arcuate fixed contacts 5*a* and 6*a*, respectively. Arcuate contacts 3*a*, 4*a*, 5*a* and 6*a* are connected by leads L to contacts 1, 2 of a selector switch device which, in turn, are conductively connected to taps A and B, as shown in FIGS. 1 and 4. The blade contacts of disconnects 5 and 6 are connected by leads to networks or tap-changing circuits $St_1$ and $St_2$, respectively, as indicated in FIG. 5 by arrows marked $St_1$ and $St_2$. The blade contacts forming part of the pairs of current-carrying contacts 3, 4 and the blade contacts forming part of the disconnects 5 and 6 are tied to a tie bar $S_a$, and pivot jointly about their respective pivots when tie bar $S_a$ is moved to the left, or to the right, as the case may be. The right end of tie bar $S_a$ is slidably supported in a slide bearing $S_b$, and supports a pair of abutments or dogs $S_1$ and $S_2$ which determine two limit positions of tie bar $S_a$ by engaging opposite end surfaces of slide bearing $S_b$. Since tie bar $S_a$ has two limit positions, the blades of the pairs of current-carrying contacts 3, 4 and the blades of disconnects 5, 6 have also two limit positions. Reference characters $S_p$ has been applied to indicate a motor for operating tie bar $S_a$ by the intermediary of linkages $S_1$ and an overcenter spring $S_s$. Linkages $S_1$ and overcenter spring $S_s$ have been shown in a very diagrammatic fashion, such elements or components being well known in the art, and not requiring a detailed disclosure. In FIG. 5 the operating mechanism is shown in a position wherein the pair of current-carrying contacts 4 is separated or open, disconnects 5 and 6 are separated or open, and the pair of current-carrying contacts 3 is in engagement or closed. In this position network or tap-changing circuit $St_1$ is shunted by the pair of current-carrying contacts 3 and the outgoing line A*bl* is directly connected to tap A. When tie bar $S_a$ is moved from its left limit position to its right limit position, disconnects 5 and 6 are closed before the pair of current-carrying contacts 3 is separated. The angles encompassed by arcuate contacts 5*a*, 6*a* is by far larger than the angle encompassed by arcuate contacts 3*a*, 4*a*, and the blades of disconnects 5, 6 are still in engagement with fixed contacts 5*a*, 6*a* after the blade of the pair of current-carrying contacts 3 has parted from its cooperating fixed contact 3*a*. The blade of the pair of current-carrying contacts 4 engages its cooperating fixed arcuate contact 4*a* before disconnects 5 and 6 open. Disconnects 5, 6 open only after network or tap-changing circuit $St_2$ has been shunted out by engagement of the pair of current-carrying contacts 4, thus establishing a direct current path from tap B and selector contacts 2 through lead L5 to outgoing lead or line A*bl*.

When it is intended to effect a tap-changing operation from tap B to tap A, the direction of the movement of tie bar $S_a$ is reversed, and this reverses the sequence of the above described switching operations performed by pairs of current-carrying contacts 3, 4 and disconnects 5, 6.

It is apparent from the foregoing that both disconnects 5, 6, close simultaneously preparatory to a tap-changing operation before one of the pairs of current-carrying contacts 3, 4 parts, that the pairs of current-carrying contacts 3 and 4 can never be closed at the same time, and that disconnects 5, 6 open only subsequent to engagement of one of the pairs of current-carrying contacts 3, 4.

It will be understood that although but two preferred embodiments of the invention have been illustrated and described in detail, the invention is not limited thereto. It will also be understood that the circuitry and the structure illustrated and described may be modified without departing from the spirit and scope of the invention.

I claim as my invention:

1. A transfer switch for effecting tap-changing operations in transformers having a tapped winding including:

(a) a first tap-changing circuit having a pair of parallel branches including inversely connected thyristors and having two terminals;

(b) a second tap-changing circuit having a pair of parallel branches including inversely connected thyristors and having two terminals;

(c) means for conductively connecting one terminal of said first tap-changing circuit to a first tap of a transformer winding and for conductively connecting another terminal of said first tap-changing circuit to an outgoing line;

(d) means for conductively connecting one terminal of said second tap-changing circuit to a second tap of a transformer winding and for conductively connecting another terminal of said second tap-changing circuit to said outgoing line;

(e) an impulse amplifier for selectively triggering said thyristors in said first tap-changing circuit and said thyristors in said second tap-changing circuit;

(f) a first blocking voltage sensing means connected across said first tap-changing circuit;

(g) a second blocking voltage sensing means connected across said second tap-changing circuit;

(h) a bistable circuit having two outputs for selectively emitting a tap-changing signal from either of said two outputs;

(i) a first system of digital logic elements under the joint control of said second blocking voltage-sensing means and one of said two outputs of said bistable circuit and controlling said impulse amplifier to selectively allow and preclude triggering of said thyristors of said first tap-changing circuit by said impulse amplifier depending upon the voltage sensed by said second blocking voltage-sensing means; and (j) a second system of digital logic elements under the joint control of said first blocking voltage sensing means and the other of said two outputs of said bistable circuit and controlling said impulse amplifier to selectively allow and preclude triggering of said thyristors of said second tap-changing circuit by said impulse amplifier depending upon the voltage sensed by said first blocking voltage-sensing means.

2. A transfer switch as specified in claim 1 wherein said first system of digital logic elements and said second system of digital logic elements each include a NOR gate and an inverter gate under the control of said NOR gate and controlling said impulse amplifier, said NOR gate of said first system of digital elements being under the joint control of said second blocking voltage sensing means and one of said two outputs of said bistable circuit, and said NOR gate of said second system of digital elements being under the joint control of said first blocking voltage sensing means and the other of said two outputs of said bistable circuit.

3. A transfer switch as specified in claim 1 including:

(a) a first current-sensing device for sensing the current in said first tap-changing circuit;

(b) a second current-sensing device for sensing the current in said second tap-changing circuit;

(c) a NOR gate having two inputs and one output in each said first system of digital logic elements and said second system of digital logic elements, said NOR gate of said first system of digital logic elements being under the joint control of said second blocking voltage sensing means and one of said two outputs of said bistable circuit and said NOR gate of said second system of digital logic elements being under the joint control of said first blocking voltage sensing means and the other of said two outputs of said bistable circuit; and (d) a NAND gate having two inputs and one output in each said first system of digital logic elements and said second system of digital logic elements, said NAND gate of said first system of digital logic elements being under the joint control of said first current-sensing device and the output of said NOR gate of said first system of digital logic elements, and said NAND gate of said second system of digital logic elements being under the joint control of said second current-sensing device and the output of said NOR gate of said second system of digital logic elements; and (e) conductor means operatively relating the output of said NAND gate of said first system of digital logic elements and the output of said NAND gate of said second system of digital logic elements to said impulse amplifier.

4. A transfer switch as specified in claim 1 including:

(a) an impulse amplifier having a pair of primary windings energized by a D-C power supply and two pairs of secondary thyristor trigger windings, one pair of said two pairs of thyristor trigger windings being connected to trigger said thyristors in said first tap-changing circuit and the other pair of said two pairs of thyristor trigger windings being connected to trigger said thyristors in said second tap-changing circuit;

(b) a first current-sensing device for sensing currents in said first tap-changing circuit, said first current-sensing device including a rectifier supplying a D-C output proportional to A-C currents in said first tap-changing circuit;

(c) a second current-sensing device for sensing currents in said second tap-changing circuit, said second current-sensing device including a rectifier supplying a D-C output proportional to A-C currents in said second tap-changing circuit;

(d) said first system of digital logic elements including a NOR gate and a NAND gate each having two inputs and one output, one input of said NOR gate being under the control of one output of said bistable circuit, the other input of said NOR gate being under the control of said second blocking voltage-sensing means, one input of said NAND gate being under the control of the output of said NOR gate and the other input of said NAND gate being under the control of said first current-sensing device; and (e) said second system of digital logic elements including a NOR gate and a NAND gate each having two inputs and one output, one input of said NOR gate being under the control of the other output of said bistable circuit, the other input of said NOR gate being under the control of said first blocking voltage sensing means, one input of said NAND gate being under the control of the output of said NOR gate and the other input of said NAND gate being under the control of said second current-sensing device; and (f) conductor means operatively relating the output of said NAND gate of said first system of digital logic elements and the output of said NAND gate of said second system of digital logic elements to said impulse amplifier.

5. A transfer switch for effecting tap-changing operations in transformers having a tapped winding including:

(a) a first tap-changing circuit having a pair of parallel branches including inversely connected thyristors and having two terminals;

(b) a second tap-changing circuit having a pair of parallel branches including inversely connected thyristors and having two terminals;

(c) means for conductively connecting one terminal of said first tap-changing circuit to a first tap of a transformer winding and for conductively connecting another terminal of said first tap-changing circuit to an outgoing line;

(d) means for conductively connecting one terminal of said second tap-changing circuit to a second tap of a transformer winding and for conductively connecting another terminal of said second tap-changing circuit to said outgoing line;

(e) a first blocking voltage sensing means connected across said first tap-changing circuit;

(f) a second blocking voltage sensing means connected across said second tap-changing circuit;

(g) means for triggering said thyristors of said first tap-changing circuit including a first system of digital logic elements under the control of said second blocking voltage sensing means precluding triggering of said thyristors of said first tap-changing circuit as long as the voltage sensed by said second blocking voltage means is below a predetermined value; and (h) means for triggering said thyristors of said second tap-changing circuit including a second system of digital logic elements under the control of said first blocking voltage sensing means precluding triggering of said thyristors of said second tap-changing circuit as long as the voltage sensed by said first blocking voltage sensing means is below a predetermined value.

6. A transfer switch for effecting tap-changing operations in transformers having a tapped winding including:

(a) a first tap-changing circuit having a pair of parallel branches including inversely connected thyristors and having two terminals;

(b) a second tap-changing circuit having a pair of parallel branches including inversely connected thyristors and having two terminals;

(c) means for conductively connecting one terminal of said first tap-changing circuit to a first tap of a transformer winding and for conductively connecting another terminal of said first tap-changing circuit to an outgoing line;

(d) means for conductively connecting one terminal of said second tap-changing circuit to a second tap of a transformer winding and for conductively connecting another terminal of said second tap-changing circuit to said outgoing line;

(e) a first blocking voltage sensing means connected across said first tap-changing circuit;

(f) a second blocking voltage sensing means connected across said second tap-changing circuit;

(g) a first current sensing means for sensing the current in said first tap-changing circuit in terms of a first D-C voltage;

(h) a second current sensing means for sensing the current in said second tap-changing circuit in terms of a second D-C voltage;

(i) means for triggering said thyristors of said first tap-changing circuit including a first system of digital logic elements under the joint control of said second blocking voltage sensing means and of said first current sensing means precluding triggering of said thyristors of said first tap-changing circuit as long as the voltage sensed by said second blocking voltage sensing means is below a predetermined value and allowing triggering of said thyristors of said first tap-changing circuit only when said first D-C voltage is less than a predetermined value; and (j) means for triggering said thyristors in said second tap-changing circuit including a second system of digital logic elements under the joint control of said first blocking voltage sensing means and of said second current sensing means for precluding triggering of said thyristors of said second tap-changing circuit as long as the voltage sensed by said first blocking voltage sensing means is below a predetermined value and allowing triggering of said thyristors of said second tap-changing circuit only when said second D-C voltage is less than a predetermined value.

References Cited

UNITED STATES PATENTS

| | | | |
|---|---|---|---|
| 3,263,157 | 7/1966 | Klein | 323—24 X |
| 3,340,462 | 9/1967 | Ebersohl | 323—43.5 |

JOHN F. COUCH, Primary Examiner

W. H. BEHA, JR., Assistant Examiner

U.S. Cl. X.R.

323—24